(12) United States Patent
Sakaguchi et al.

(10) Patent No.: US 6,334,788 B1
(45) Date of Patent: Jan. 1, 2002

(54) ELECTRONIC APPARATUS FOR REPRODUCING DATA

(75) Inventors: Hirotaka Sakaguchi; Atsuto Ohashi, both of Tokyo; Tatsuo Yoshida; Hitoshi Tamai, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,106

(22) Filed: Apr. 27, 2000

(30) Foreign Application Priority Data

| May 14, 1999 | (JP) | ........................................... 11-135011 |
| May 14, 1999 | (JP) | ........................................... 11-135014 |
| May 14, 1999 | (JP) | ........................................... 11-135015 |

(51) Int. Cl.[7] .............................................. H01R 13/60
(52) U.S. Cl. ..................................................... 439/528
(58) Field of Search .................................. 439/577, 304, 439/528, 501, 620, 456, 457, 459, 449

(56) References Cited

U.S. PATENT DOCUMENTS

| 4,815,837 A | * | 3/1989 | Kikuchi et al. .............. 439/459 |
| 4,865,564 A | * | 9/1989 | Denkmann et al. .......... 439/676 |
| 5,507,667 A | * | 4/1996 | Hahn et al. .................. 439/528 |
| 5,691,882 A | * | 11/1997 | Ma ............................. 439/528 |
| 5,871,373 A | * | 2/1999 | Pacini et al. ................. 439/577 |
| 6,058,089 A | * | 5/2000 | Youens et al. ............... 439/528 |
| 6,109,958 A | * | 8/2000 | Ke .............................. 439/501 |

FOREIGN PATENT DOCUMENTS

| GB | 2069254 A | * | 8/1981 | .................. 439/459 |

* cited by examiner

*Primary Examiner*—Tho D. Ta
(74) *Attorney, Agent, or Firm*—Ronald P. Kananen; Rader, Fishman & Grauer PLLC

(57) ABSTRACT

An electronic apparatus which is handy to carry. According to the present invention, in an electronic apparatus including a main portion, an electric connector for external connection, and a connecting line for electrically connecting the main portion with the connector, recesses are provided in the main portion for containing and removably holding the connector and connecting line, thereby the connector and the connecting line may be held in the main portion as one united body to make the drive unit handy, thus, it is possible to realize such an electronic apparatus that can be easily carried.

8 Claims, 17 Drawing Sheets

ELECTRONIC APPARATUS FOR REPRODUCING DATA

BACKGROUND OF THE INVENTION

1. Field of the Invention

The present invention relates to an electronic apparatus, and more particularly, is suitably applied to a drive unit having a main portion for reproducing a predetermined data prerecorded on recording medium, for example, compact disc read only memory(CD-ROM).

2. Description of the Related Art

In a conventional drive unit, a main portion into which a CD-ROM disc is removably inserted is electrically connected with a prescribed connector for external connection through a signal cable.

The drive unit has been used as an external electronic apparatus for a machine, for example, a personal computer, by electrically connected the drive unit to the personal computer through a connector.

In operation, when a reproduction instruction is provided from the personal computer to the drive unit through the connector and the signal cable, in this order, the drive unit reproduces a predetermined data prerecorded on the CD-ROM, and sends the reproduced data to the personal computer through the signal cable and the cable, in this order.

In this way, the drive unit can provide various data prerecorded on the CD-ROM to the personal computer.

The signal cable and the connector are routed outside of the main portion of the drive unit and, when connected to the personal computer, can be placed in the proximity of the personal computer.

However, because the signal cable and the connector are bulky with respect to the main portion and inconvenient to handle, the drive unit is unhandy to carry.

SUMMARY OF THE INVENTION

In view of the foregoing, an object of the invention is to provide an electronic apparatus that can be carried handily.

The foregoing object and other objects of the invention have been achieved by the provision of an electronic apparatus comprising a main portion, an electric connector for external connection, and a connecting line for electrically connecting the main portion with the connector, recesses are provided in the main portion for containing and removably holding the connector and connecting line.

As a result, the connector and the connecting line may be held in the main portion as one united body to make the drive unit handy.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Configuration of Drive Unit 1 According to the Embodiment

Figure 1:
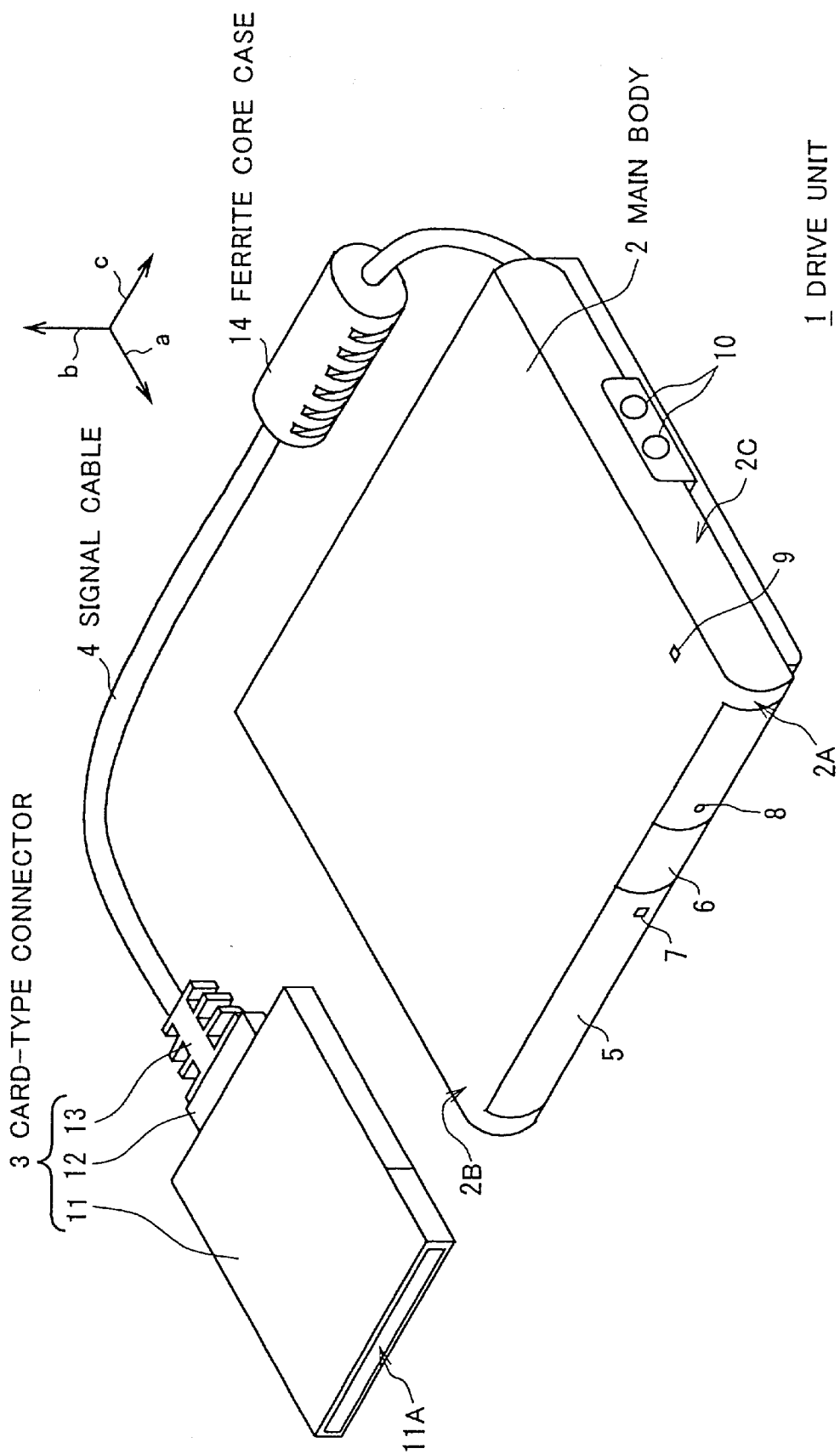
FIG. 1 is a schematic perspective view showing one embodiment of a configuration of a drive unit according to the present invention.

In FIG. 1, reference numeral 1 denotes a drive unit to which the present invention is applied in its entirety. The drive unit 1 is configured by a main portion 2, a card type connector 3, and a signal cable 4 for electrically interconnecting them.

A CD-ROM drive is contained in the main portion 2 and an operating panel 5 provided on the tray of the CD-ROM drive is placed on a side 2A at the front (in the direction indicated by an arrow a) of the main portion 2 (hereinafter called the "front side"). Provided on the operating panel are an eject button 6 automatically ejecting the tray of the CD-ROM drive from inside the main portion 2 and automatically retracting the ejected tray into the main portion 2 and an access indicator lamp 7 configured by a light emitting diode (LED). In addition, a manual eject hole 8 for manually ejecting the tray of the CD-ROM drive is bored in the operating panel.

A power indicator lamp 9 comprising an LED is provided on one surface 2B of the main portion 2 in the direction indicated by an arrow b for indicating that the drive unit is activated. A terminal 10 for external connection is provided on one side surface 2C in the right direction indicated by an arrow c.

The card-type connector 3 has a flat rectangular-shaped card unit 11 comprising a Personal Computer Memory Card International Association (PCMCIA) card (so-called the "Personal Computer (PC) card). A predetermined connector 11A is embedded in the front side surface of the card unit 11 and a first cable holding member 12 made of a rigid material and a second cable holding member 13 made of a flexible material are provided serially on the rear side surface of the card unit 11.

The second cable holding member 13 holds one end of the signal cable 4 and has a plurality of projections provided at a predetermined pitch on each side of the signal cable 4.

The second cable holding member 13 constrains the bending of the signal cable 4 by contacting the projections with each other when the signal cable 4 is bent laterally, thus preventing the signal cable 4 from breakage due to overbending.

The first cable holding member 12 is held in the card unit 11, holds the second cable holding member 13, and guides a plurality of signal lines contained in the signal cable 4 from the one end of the signal cable 4 held by the second cable holding member 13 through a hole within the signal cable 4 into the card unit 11.

Each of the signal lines of the signal cable 4 is conductively connected to the connector 11A within the card unit 11.

Thus, the main portion 2 of the drive unit 1 is electrically connected with, for example, a personal computer through the signal cable 4 and card-type connector 3, in this order, by inserting the card-type connector 3 into a corresponding card slot provided in the personal computer (not shown).

In the connected state, the main portion 2 takes a power-supply voltage provided from the personal computer into its internal circuitry through the card-type connector 3 and the signal cable 4, activates the circuitry according to the supply-voltage taken in, and notifies the user of the activation by turning on the power indicator lamp 9.

When the eject button 6 is pressed down, the main portion 2 automatically slides the tray of the CD-ROM drive together with the operating panel 5 forward to the outside, and when CD-ROM is loaded in the tray in this state and the eject button 6 is repressed, it automatically slides the tray backward to take the CD-ROM into the main portion 2.

Thus, when a reproduction instruction is provided from the personal computer-through the card-type connector 3 and the signal cable 4 to the main portion 2, the main portion 2 reproduces a predetermined data prerecorded on the CD-ROM according to the reproduction instruction and sends the reproduced data to the personal computer through the signal cable 4 and the card-type connector 3.

The signal cable 4 is passed through a ferrite core (not shown) made of a cylindrical magnetic material contained in a ferrite core case 14 to reduce, by the ferrite core, electrical noise produced by the signal cable 4.

(2) Configuration of the Outside of the Main Portion 2

Figure 2:
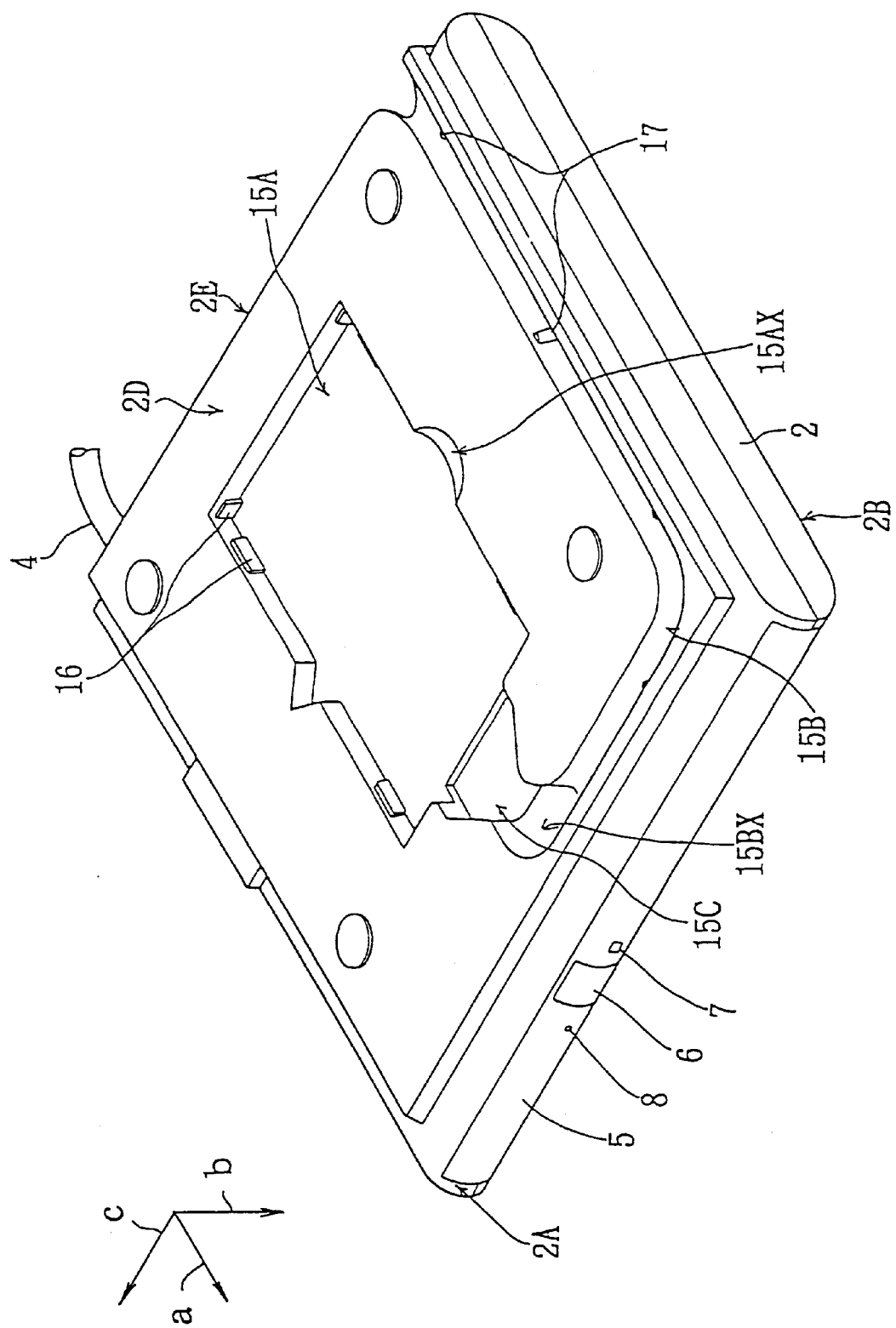
FIG. 2 is a schematic perspective view showing a configuration of another surface of a main portion.

In addition to the configuration described above, a recess 15A accommodating the card unit 11 of the card-type connector 3 and a recess 15B accommodating the signal cable 4 are provided on another surface 2D opposite to the surface 2B of the main portion 2 of the drive unit 1, as shown in FIG. 2. The recesses 15A and 15B are linked by a recess 15C accommodating the first and second cable holding members 12 and 13 of the card-type connector 3.

In practice, the shape and size of the orifice of the recess for card 15A are chosen according to the shape (rectangle) and size of the one surface of the card unit 11, and its length from the front to rear end is chosen so as to be substantially equal to the thickness of the card unit.

The length of the recess for cable 15B is chosen according to the length of the signal cable 4 so that the recess for cable 15B is formed in generally L-shape running from the left end of side 2E at the rear of the main portion 2 (hereinafter called the "rear side") into the middle of the front side 2A through the proximity of the left side of the main portion 2. The width and the length from the front to the rear end of the recess for cable 15B are chosen so as to be substantially equivalent to the diameter of the signal cable 4.

The shape and size of the orifice of the recess for holding member 15C are chosen according to the shape (trapezoid) and the size of the upper surface of the first and second cable holding members 12 and 13. The depth of the recess for holding member 15C is chosen so as to be substantially equal to the thickness of the first and second cable holding members 12 and 13.

Figure 3:
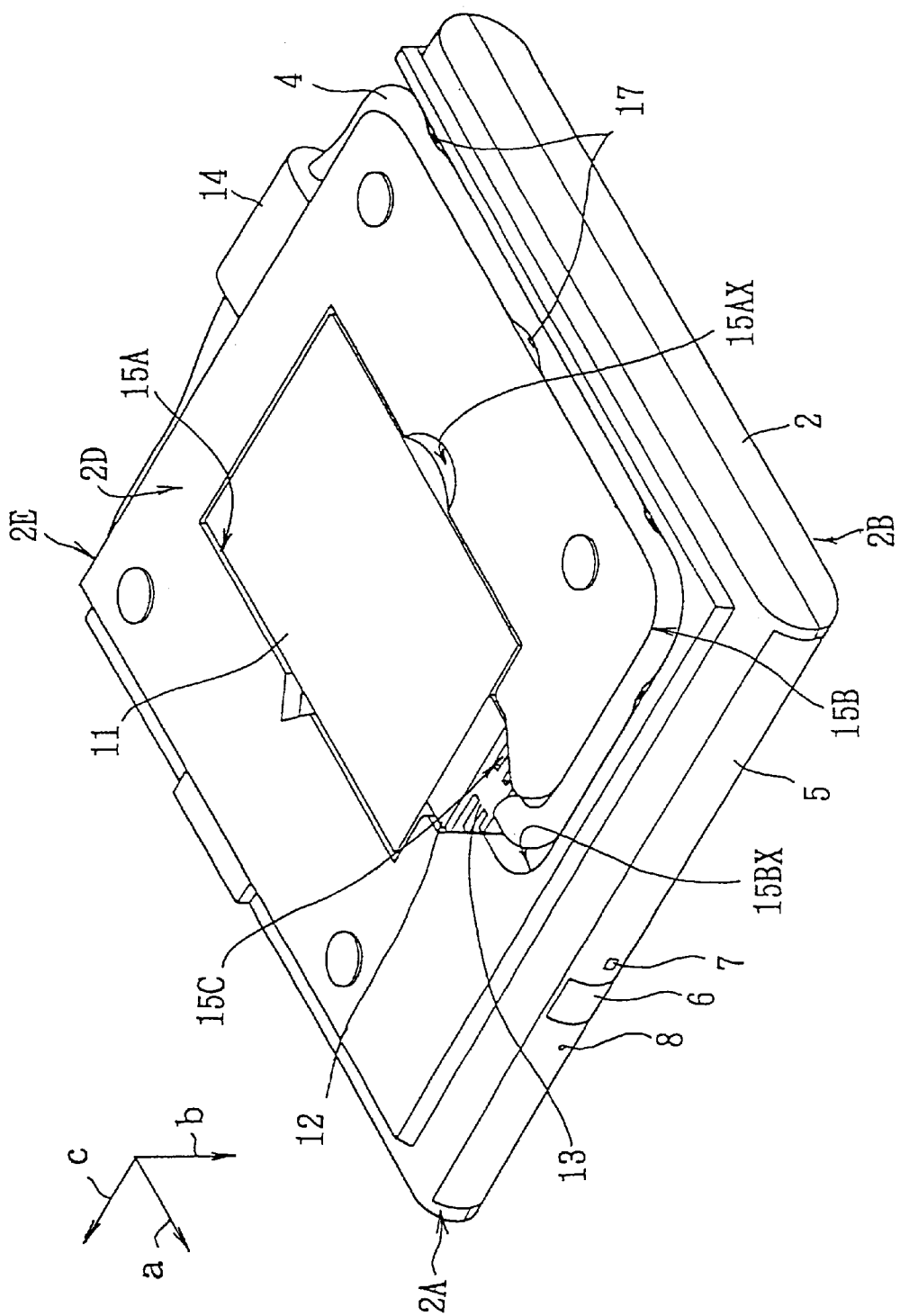
FIG. 3 is a schematic perspective view for describing how a card-type connector and a signal cable are contained in the main portion.

Thus, the card unit 11 of the card-type connector 3, the first and second cable holding members 12 and 13, and a part of the signal cable 4 can be contained in the corresponding recess for cable 15A, recess for holding member 15C, and recess for cable 15B, respectively, in such a manner that they do not protrude from another surface 2D of the main portion 2, as shown in FIG. 3.

An elastic member 16 made of an elastic material such as rubber is provided at either end (along the longitudinal direction) of the internal sides of the recess for card 15A as shown in FIG. 2. Thus, when the card unit 11 is placed in the recess for card 15A, the elastic members 16 of the recess for card 15A is brought into intimate contact with the sides of the card unit 11, so that the card unit 11 is removably held in the recess for card 15A.

In the recess for cable 15B (FIG. 2), projections 17 substantially parallel to the vertical direction are provided alternately on the opposed inner sides.

The outside of the signal cable 4 is coated with elastic material. Therefore, when the signal cable 4 is placed in the recess for cable 15B, the projections 17 are brought into intimate contact with the coating of the signal cable 4 in such a way that they are pressed against the coating, thereby the signal cable 4 is removably held in the recess for cable 15B.

As a result, when the card unit 11 and the signal cable 4 are held in the recess for card 15A and the recess for cable 15B, the held card unit 11 and the signal cable 4 can keep the first and second cable holding members 12 and 13 in the recess 15C in a removable manner, even if no mechanism for holding the first and second cable holding members 12 and 13 is provided in the recess for holding member 15C.

In addition, a wide portion 15BX is provided at one end (hereinafter called the "one cable recess end") of the recess for cable 15B (FIG. 2) that borders on the recess for holding member 15C.

Even if one end of the signal cable 4 is extruded into the recess for holding member 15C when the signal cable 4 is placed in the order from the other end (hereinafter called the "other cable recess end") of the recess for cable 15B witch borders on the rear side 2E of the main portion 2 to the one recess end, the extruded end of the signal cable can be contained in the wide portion 15BX because, when the first and second cable holding members 12 and 13 and the card unit 11 are subsequently placed in the corresponding recesses 15C and 15A in this order, the shape of the second cable holding member 12 changes accordingly, preventing the end of the signal cable from projecting to the outside of another surface 2D of the main portion 2.

Thus, in the main portion, according to need, the card-type connector 3 and signal cable 4 can be held as one united body in the recess for card 15A, the recess for cable 15B, and the recess for holding member 15C of another surface 2D so as not to project outward from another surface 2D. By holding the card-type connector 3 and the signal cable 4 in the recess for card 15A, the recess for cable 15B, and the recess for holding member 15C in this way, the portability of the drive unit 1 can be improved when it is carried.

In addition, when the drive unit 1 is stored, the drive unit 1 can be made handy and the storage space occupied by the drive unit 1 can be reduced by holding the card-type connector 3 and the signal cable 4 in the recess for card 15A, the recess for cable 15B, and the recess for holding member 15C.

A spherical notch 15AX is provided in a predetermined portion of the open end of the recess for card 15A so that the user can put the fingers on the card unit 11 held in the recess for card 15A through this notch 15AX.

Thus, to take the card-type connector 3 out of the main portion 2, the card unit 11 is taken out of the recess for card 15A by lifting the card unit 11 off the recess 15A with the fingers being put on the card unit 11 through the notch 15AX. By this action, the first and second cable holding members 12 and 13 can also be taken out of the recess for holding member 15C and the wide portion 15BX of the recess for cable 15B, thus, the signal cable 4 is then taken out of the recess for cable 15B by pulling the end of the signal cable 4 off the recess for cable 15B.

Figure 4:
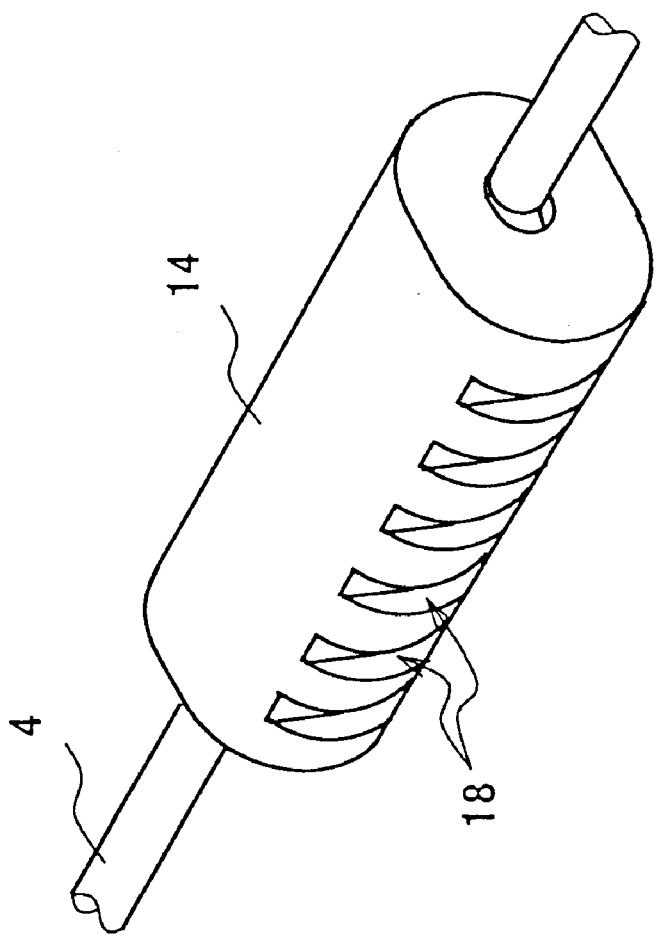
FIG. 4 is a schematic perspective view showing a configuration of a ferrite core case.
Figure 5:
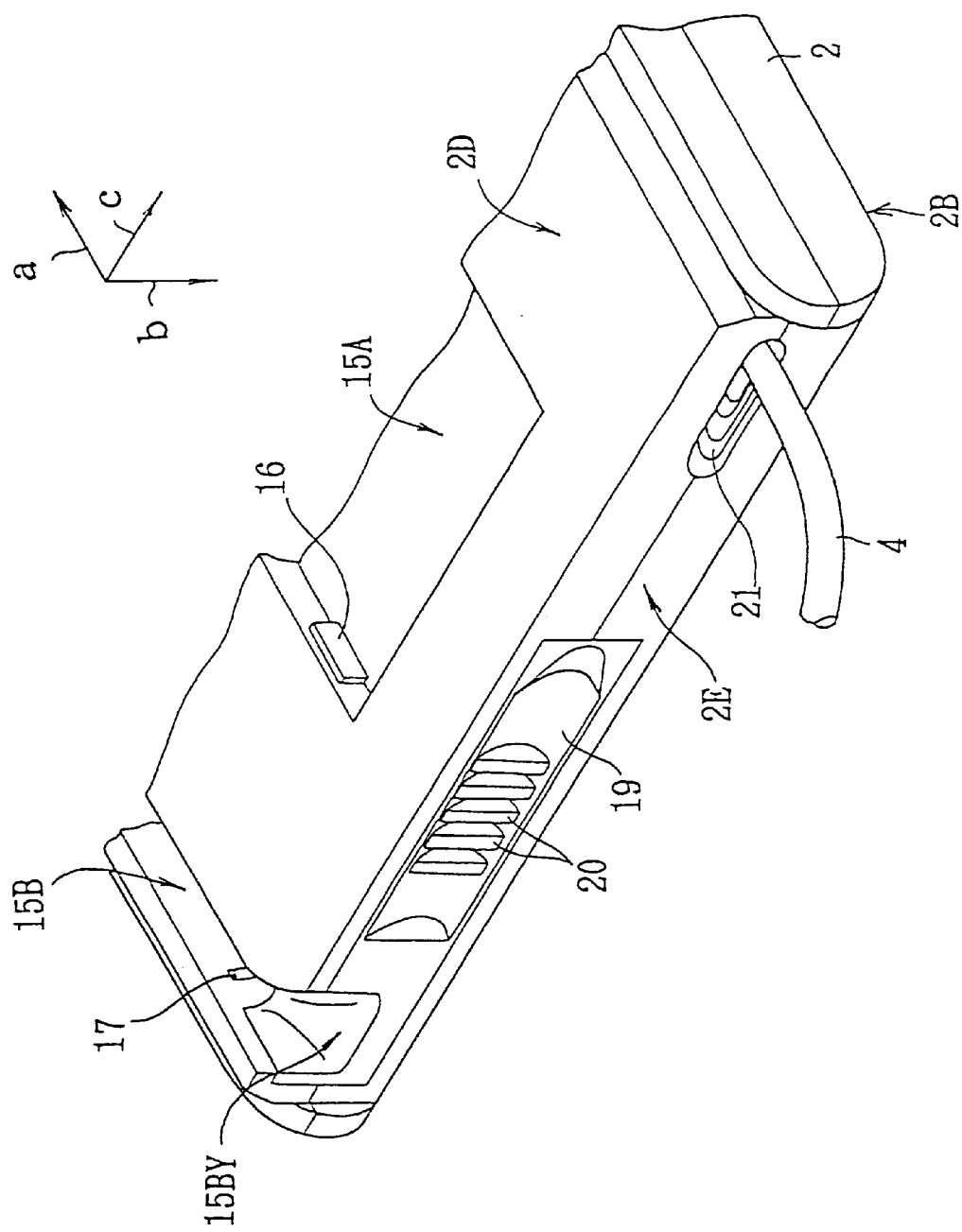
FIG. 5 is a schematic perspective view showing a configuration of a rear surface of the main portion.

The ferrite core case 14 comprises a cylinder having race-track-shaped end surfaces as shown in FIG. 4. A plurality of case recesses 18 having a predetermined width are provided at a predetermined pitch along the direction of the length of the ferrite core case 14 (hereinafter called the "longitudinal direction of the ferrite").

On the rear side 2E of the main portion 2 a case holder 19 having an arc-shaped bottom is provided, as shown in FIG. 19. A plurality of main portion protrusions 20 having approximately the same width as that of the case recesses 18 of the ferrite core case 14 are provided at an approximately the same pitch as the case recesses in the middle of the case holder 19.

Figure 6:
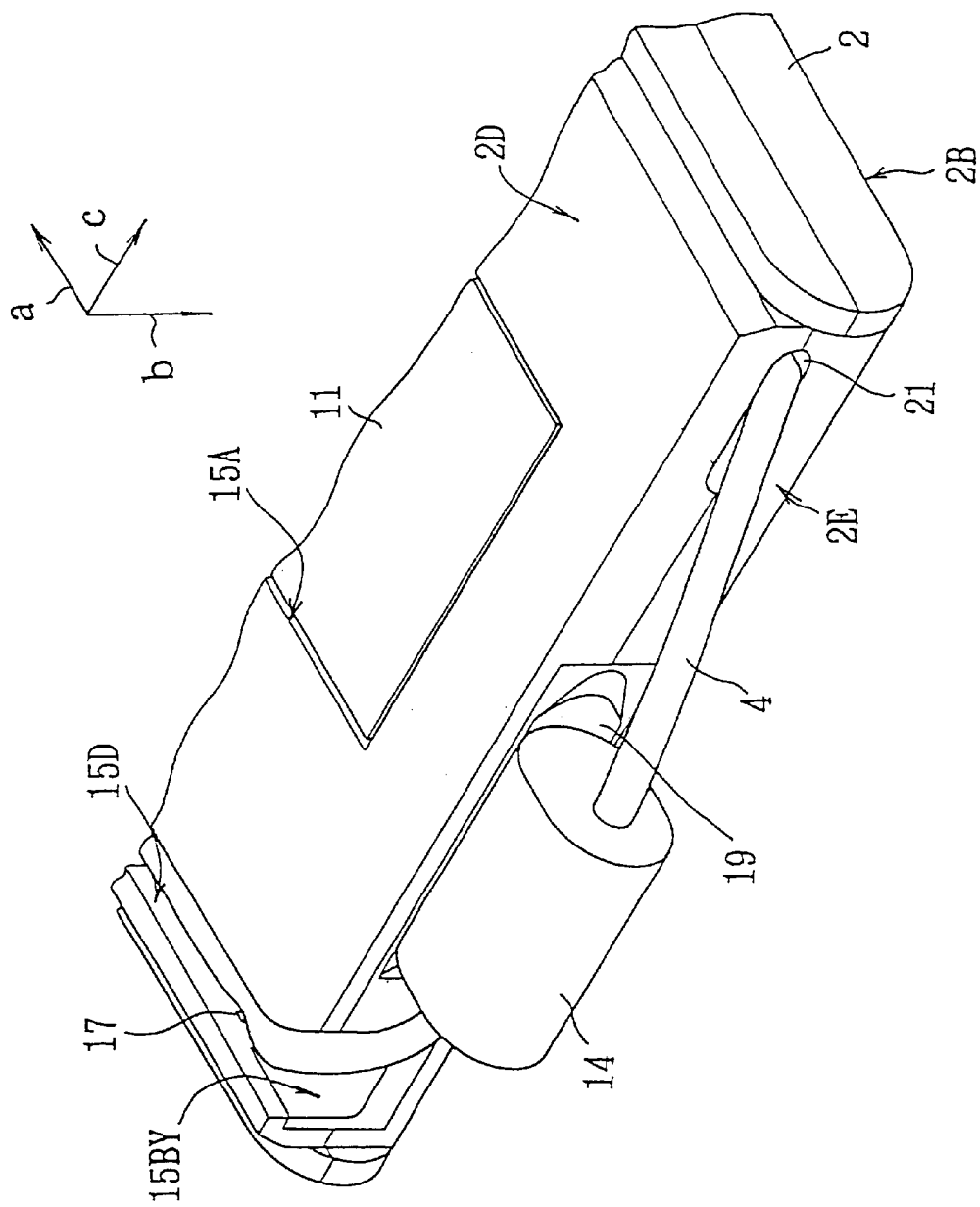
FIG. 6 is a schematic perspective view for describing how the ferrite core case is held in a case holder.

Thus, when the ferrite core case 14 is pressed against the case holder 19 with longitudinal direction of the ferrite being parallel to the lateral direction of the main portion 2 as shown in FIG. 6 in such a way each of the recesses 18 are opposed with each of the main portion recesses, the case holder 19 removably holds the ferrite case 14 by fitting each of the main portion protrusions 20 into each of the case recesses 18.

When the case holder 19 holds the ferrite core case 14, the case holder 19 contains the predetermined arc portion on the outer surface of the ferrite core case 14 in which the case recesses 18 are provided, and fits the main portion protrusions 20 into case recesses 18 to reinforce its power for holding the ferrite case 14, thereby preventing the ferrite case 14 from coming off the case holder 19 even if the user touches the ferrite case 14 during, for example, carrying the drive unit 1.

A cable pullout hole 21 is provided at the right end of the rear side 2E of the main portion 2 for pulling the signal cable 4 out of the main portion 2 and the left inner side of the cable pullout hole 21 is tapered so as to become wider toward the left end.

A tapered portion 15BY which becomes wider upward and rightward is provided on the other cable recess end.

Thus, when the ferrite core case 14 is held by the case holder 19, the signal cable 4 can be guided along the tapered left inner side of the cable pullout hole 21 and the tapered portion 15BY of the other-cable recess end to bring the signal cable 4 close to the rear side 2E of the main portion 2.

Thus, when the drive unit 1 is carried, the unitarity of the main portion 2 and the card-type connector 3 and signal cable 4 can be improved by holding the card-type connector 3 and the signal cable 4 in another surface 2D of the main portion 2 and the other end of the signal cable 4 is held on the rear side 2E of the main portion through the ferrite core case 14.

A predetermined length longer than the ferrite core case 14 is chosen as the length of the case holder 19 in the lateral direction. A number of, for example five, main portion protrusions 20 are provided only in the center and no protrusions 20 are provided at the right and left ends of the case holder 19.

A larger number of, for example seven, case recesses 18 than the main portion protrusions 20 of the case holder 19 are provided along the entire length of the ferrite core case 14.

Thus, the ferrite core case 14 can be held in the case holder 19 displaced from the center of the holder 19 in the right or left direction by a predetermined distance in pitches of the main portion protrusions 20.

Therefore, the ferrite core case 14 can be held in the case holder 19 with a displaced state even if the ferrite core case 14 is displaced rightward with respect to the case holder 19 when the card unit 11 of the card-type connector 3, the first and second cable holding members 12 and 13, and the signal cable 4 are embedded in another surface 2D in this order, or even if the ferrite core case 14 is displaced leftward with respect to the card holder 19 when the cable signal 4, the first and second cable holding members 12 and 13, and the card unit 11 are embedded in another surface 2D of the main portion 2 in this order. Thus, the sagging of the signal cable 4 can be prevented to bring the signal cable 4 closer to the main portion 2.

In addition, when the card-type connector 3 is connected to a personal computer, the length of the signal cable 4 routed between the main portion 2 and the personal computer can be adjusted by holding the ferrite core case 14 in the case holder 19 of the main portion 2. Thus, the routing of the signal cable 4 between the main portion 2 and the personal computer is prevented from becoming complicated.

Figure 7:
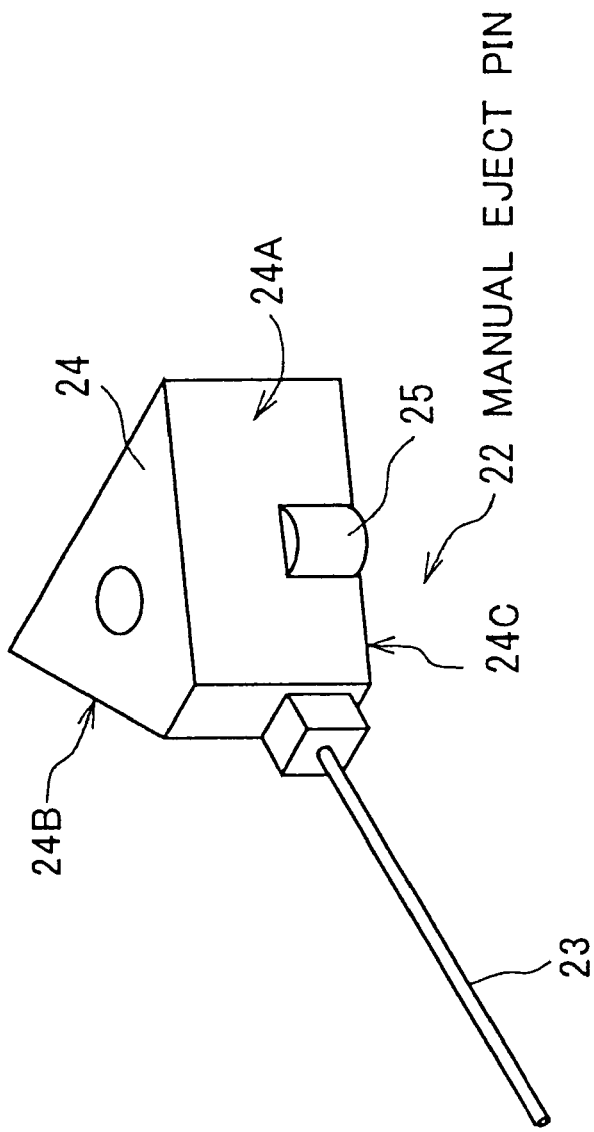
FIG. 7 is a schematic perspective view showing a configuration of a manual eject pin.

A manual eject pin 22 as shown in FIG. 7 is provided in the main portion 2. The manual eject pin 22 is formed by holding one end of a pin member 23 made of wire by a pin holder 24 which is formed in the shape of a generally triangular prism and made of, for example, acriylonitrile butadiene styrene (ABS) resin.

On adjacent first and second sides 24A and 24B of the pin holder 24 are provide pin protrusions 25 extending from the respective center toward one side 24C.

If the position of the CD-ROM changes in the tray of the CD-ROM drive due to an external shock and, as a result, the tray cannot be automatically ejected by pressing the eject button 6 (FIG. 1), the pin member 23 of the manual eject pin 22 is inserted into the manual eject hole 8 (FIG. 1).

The pin member 23 releases the hold of the tray by a holding mechanism provided within in the manual eject hole 8 to protrude the operating panel 5 from the front side 2A, so that the tray together with the operation panel 5 can be manually drawn out.

Figure 8:
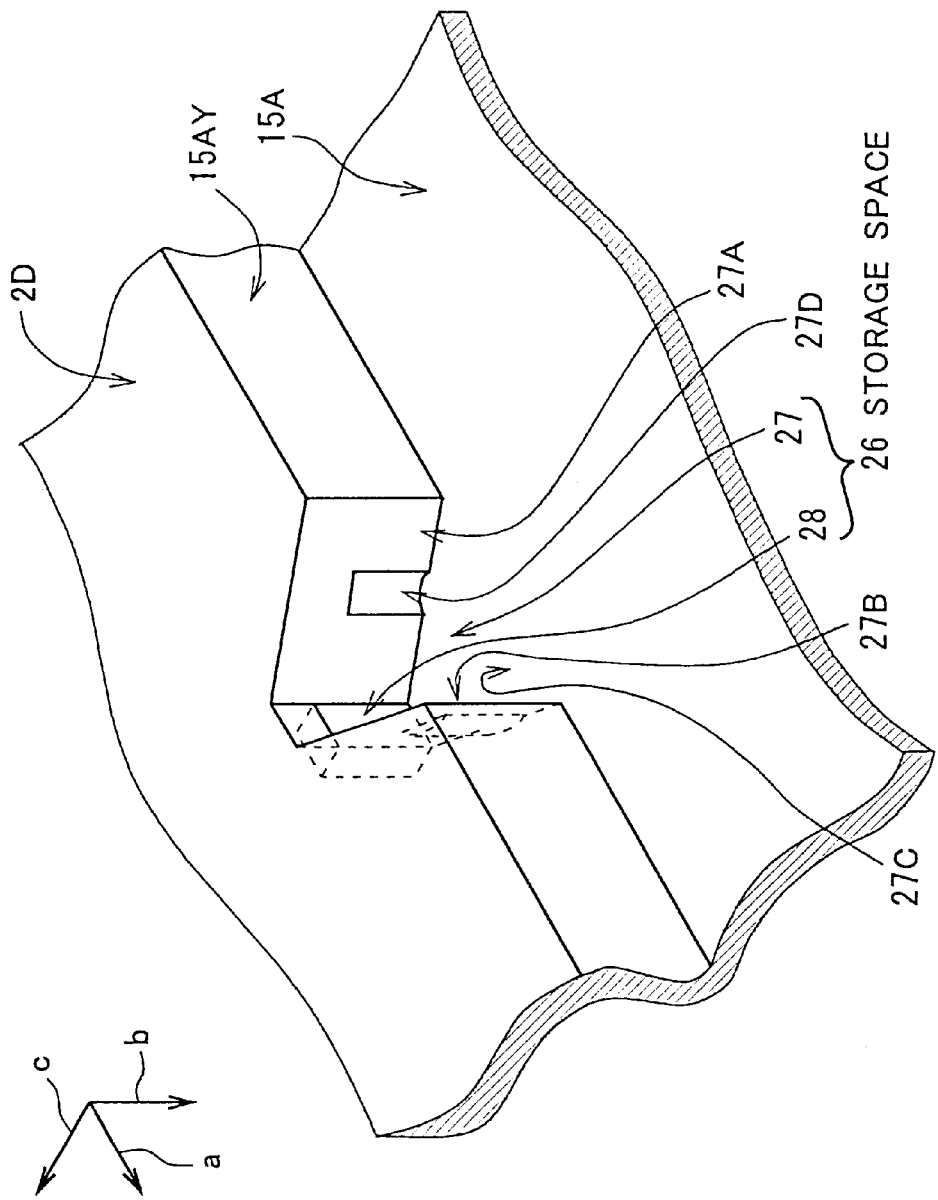
FIG. 8 is a schematic perspective view showing a configuration storage space provided in another surface of the main portion.
Figure 9:
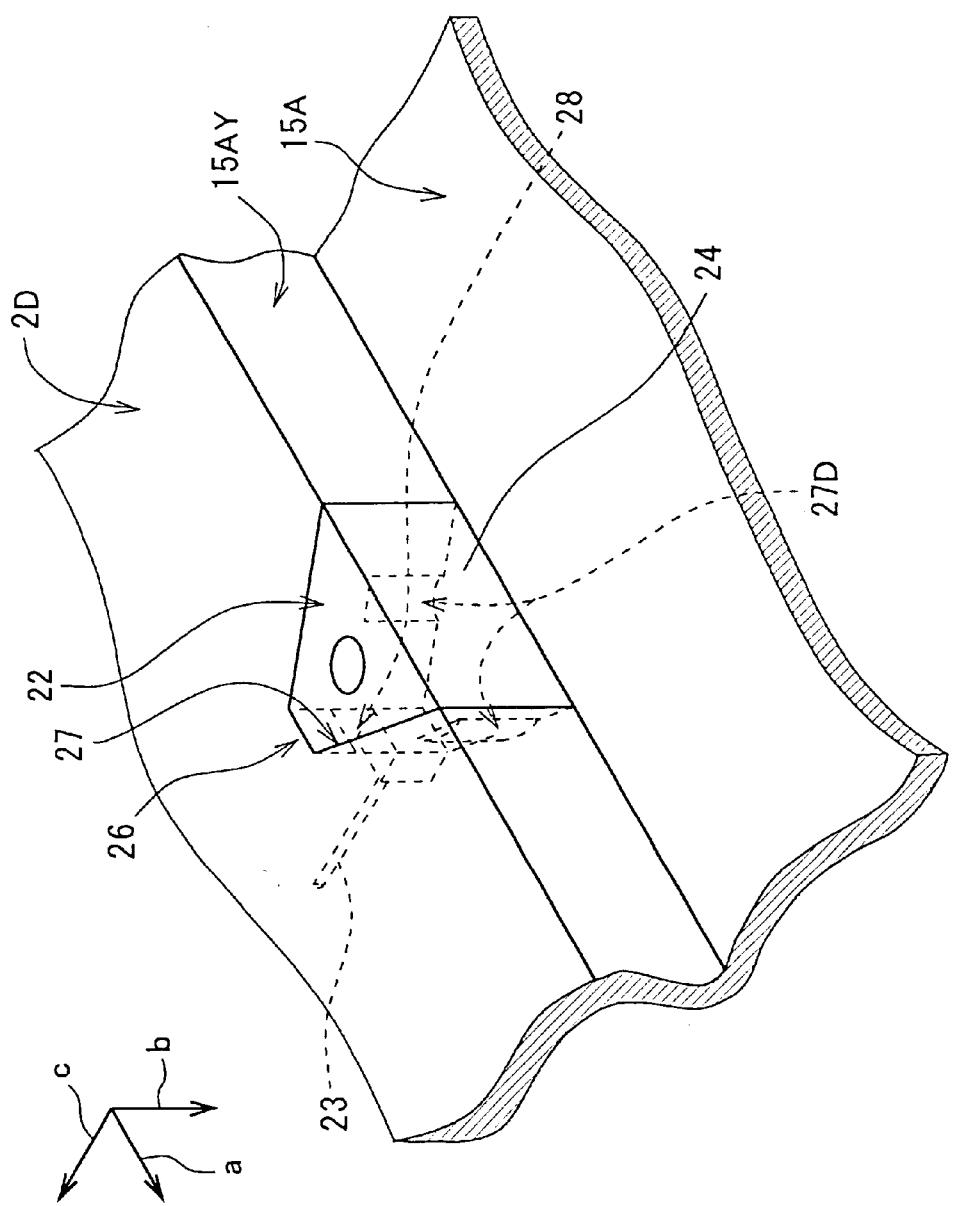
FIG. 9 is a schematic perspective view for describing how the manual eject pin is stored in the storage space.

As shown in FIG. 8, a storage space 26 is provided in the right inner side. 15AY of the recess for card 15A of the main portion 2.

In the storage space 26, a triangular notch 27 having a shape and size conforming to the shape and size of the pin holder 24 of the manual eject pin 22 is provided and a hole 28 leading to the internal space of the main portion 2 from the apex of the triangular notch 27 is bored.

In a first and second side walls 27A and 27B in the notch 27 are provided storage space recesses 27D extending from their center toward the bottom surface 27C which correspond to the pin protrusions 25 of the manual eject pin 22.

When the manual eject pin 22 is not in use, the first and second sides 24A and 24B of the pin holder 24 are abutted against the first and second side walls 27A and 27B in such a way that the pin member 23 of the manual eject pin 22 is inserted from the recess for card 15A into the hole 28.

Thus, in the main portion 2, the pin protrusions 25 of the pin holder 24 are fit into the storage space recesses 27D, so that the manual eject pin 22 can be removably stored in the storage space 26 with the pin member 23 being positioned in the internal space of the main portion 2.

In addition, the end (hereinafter called the "one end of the storage space recess 27D) of the storage space recesses 27D in the middle of the side walls 27A and 27B is formed substantially in parallel to the bottom surface 27C of the notch 27.

In the manual eject pin 22, the end (hereinafter called the "one end of the pin protrusions D25) of the pin protrusions 25 of the pin holder 24 in the middle of the first and second sides 24A and 24B is formed substantially in parallel to the surface 24C.

When the manual eject pin 22 is contained in the storage space 26, one end of the pin recesses 25 of the pin holder 24 is butted against one end of the storage space recesses 27D of the notch 27, there by one surface 24C of the pin holder 24 is abutted against the bottom surface 27C of the notch 27.

Thus, when the card unit 11 with the manual eject pin 22 contained in the storage space 26 is inserted into the recess for card 15A, or the card unit 11 with the manual eject pin 22 contained in the storage space 26 is taken out of the recess for card 15A, the pin holder 24 of the manual eject pin 22 is prevented from tilting within the notch 27 with the movement of the card unit 11, thereby the pin member 23 contained in the inner space of the main portion 22 is pressed against the CD-ROM drive or the inner surface of the main portion 2 to prevent the pin member 23 from damage such as breakage or bend.

(3) Inner Configuration of Main Portion 2

Figure 10:
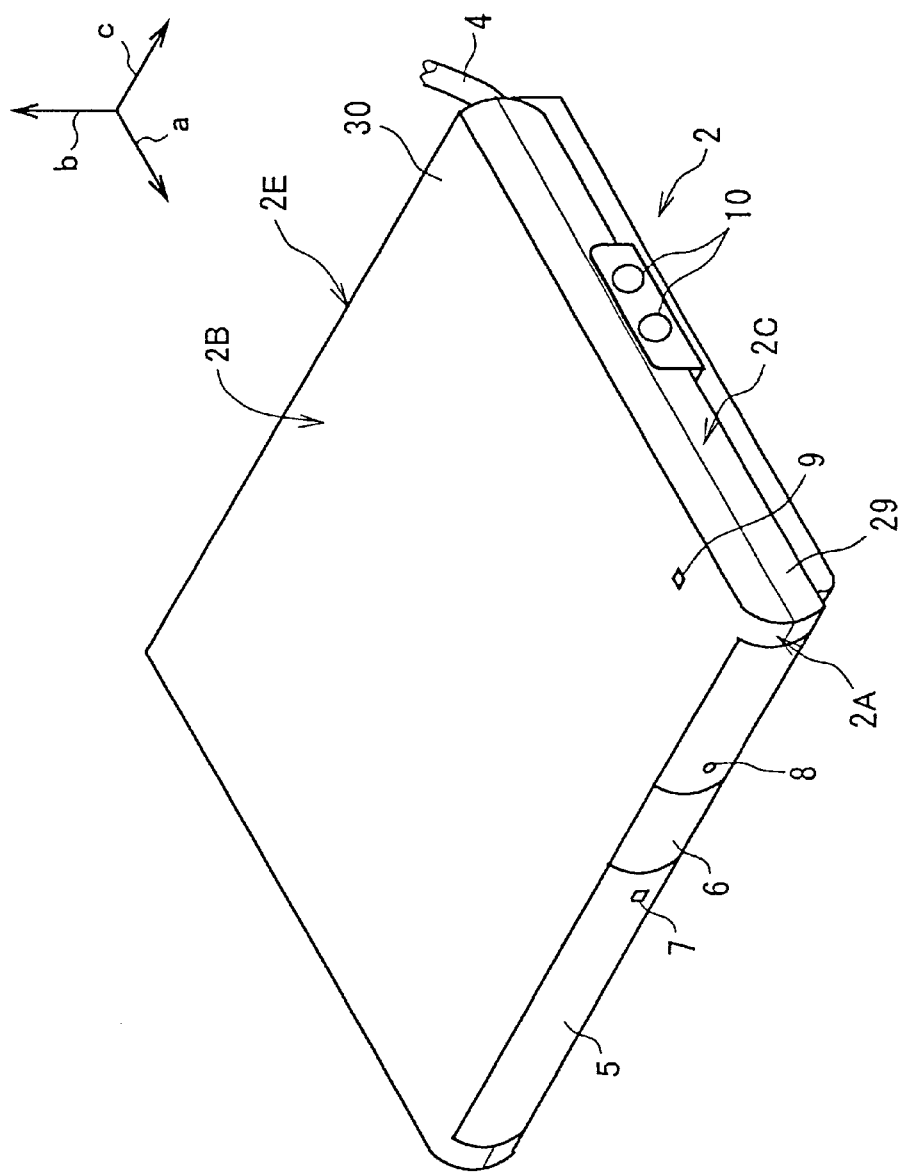
FIG. 10 is a schematic perspective view showing a configuration of a housing case of the main portion.

The ABS resin housing case of the main portion 2 consists of a first case half 29 forming the bottom of the housing case and a second case half 30 forming the cover of the housing case, as shown in FIG. 10.

Figure 11:
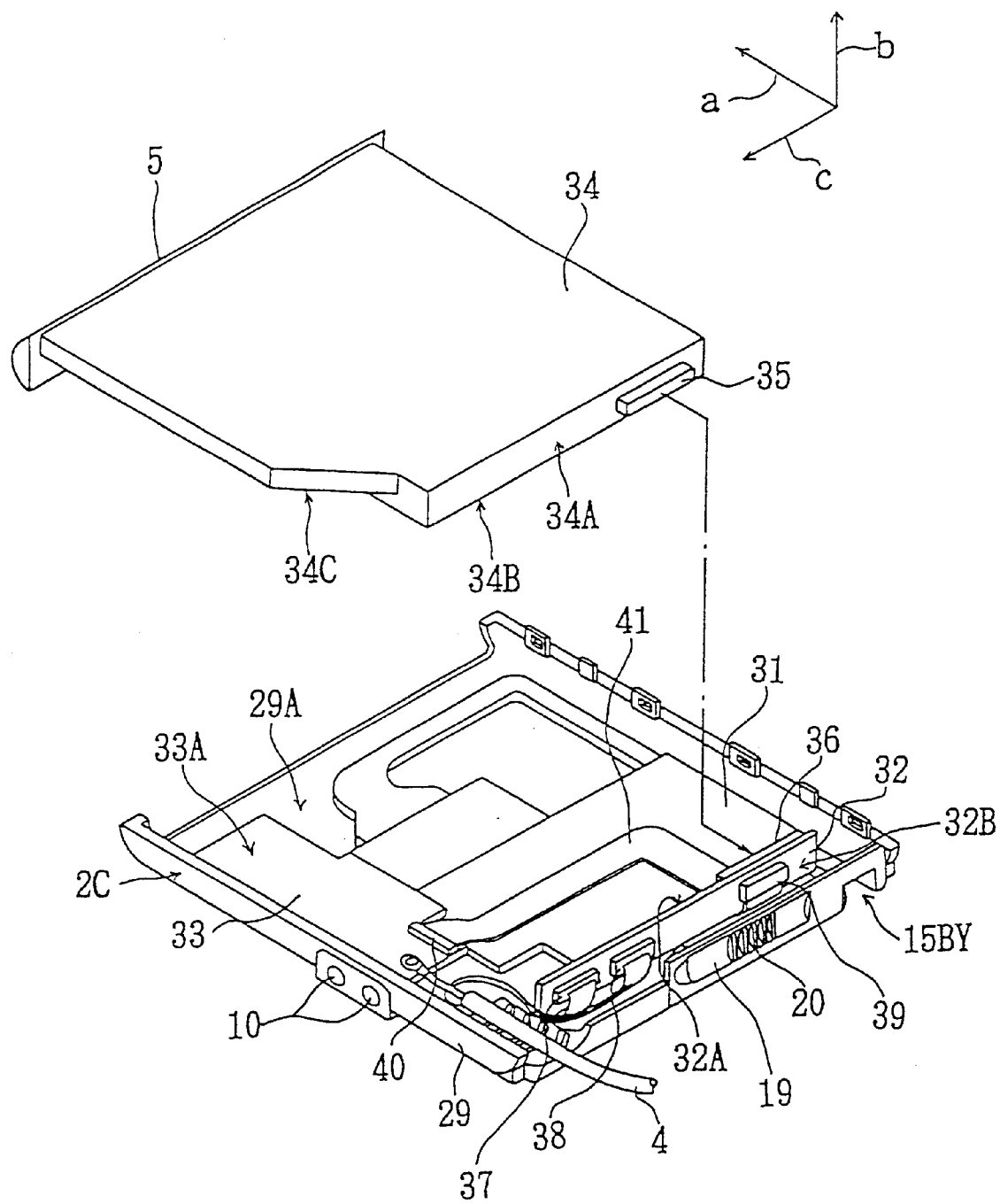
FIG. 11 is a schematic perspective view showing an inner configuration of a first case half.

As shown in FIG. 11, at the rear end of the bottom surface 29A of the first case half 29, a first shield plate 31 made of an appropriate metal material functioning as an electrical shielding material is placed, and a first circuit board 32 which could be provided by dividing an appropriate circuit board contained in the main portion of a conventional drive unit into two is placed with one surface directed forward. At the right end of the bottom surface 29A of the first case half 29, a second circuit board 33 which could be provided by dividing said circuit board into two is placed with one surface 33A being directed upward.

A first drive connector 35 is provided at the left end of the rear side 34A of the CD-ROM drive 34 and a second drive connector 36 is mounted on one surface 32A of the first circuit board 32 so as to be opposed to the first drive connector 35. Mounted on the other surface 32B of the first circuit board 32 are signal line connectors 37 and 38 to which a plurality of signal lines included in the signal cable 4 are connected and a first cable connector 39 for flat cable.

On the second circuit 33, predetermined devices such as devices controlling the power-supply voltage provided from the personal computer, and a second cable connector 40 for flat cable.

One end of a flat cable 41 routed from underneath the first circuit board 32 from the first shield plate 31 is electrically connected to the first cable connector 30 of the first circuit board 32 and the other end of the flat cable 41 is electrically connected to the second cable connector 40 of the second circuit board 33.

Thus, the signal line connectors 37 and 38 of the first circuit board 32 and the second drive connector 36 are conductively connected to corresponding circuit devices on the second circuit board 33 through the flat cable 41.

In the first case half 29, the first drive connector 35 of the CD-ROM DRIVE 34 is directly and electrically connected to the second drive connector 36 of the first circuit board 32, so that the CD-ROM drive 34 is placed over the first shield plate 31 and the second circuit board 33.

Inside of the CD-ROM drive 34, a spindle motor for rotating the CD-ROM, a optical head for reproducing data (not shown), and other components are contained collectively on the left side.

On the left side of the CD-ROM drive 34, only a part of the CD-ROM is contained.

Accordingly, the left end of the CD-ROM drive 34 is thinner than the left end thereof. Therefore, a step 34C is provided on the left end of one surface 34B of the CD-ROM drive 34.

Therefore, the shape and size of the second circuit board 33 is chosen according to the shape and size of the step 34 of the CD-ROM drive 34, and the second circuit board 33 is positioned at a height from the bottom surface 29A of the first case half 29 which is chosen according to the height from the bottom surface 29A to the step 34 so as to be contained under the step 34C of the CD-ROM drive.

Approximately the same value as the thickness of the CD-ROM drive 34 is chosen as the width of the first circuit board 32, which is substantially parallel to the vertical direction. The first circuit board 32 is placed so that the surface 32A is entirely opposed to the side surface 34A of the CD-ROM drive 34.

Thus, the height of the inner space of the main portion 2 can be made close to the thickness of the CD-ROM drive 34.

In addition, one surface 32A of the first circuit 32 is directed forward as described above and the second drive connector 36 is directly and electrically connected to the first drive connector 35 of the CD-ROM drive 34, so that the first circuit board 32 is placed close to the side surface 34A of the CD-ROM drive 34.

Thus in the main portion 2, the space occupied by the CD-ROM drive 34 and the first circuit board 32 is reduced with respect to the length from the front to rear end of the main portion 2, so that the length from the front to rear end of the main portion 2 can be made considerably close to the length from the front to rear end of the CD-ROM drive 34. Therefore the length from the front to rear end and thickness of the main portion 2 can be substantially reduced.

Figure 12:
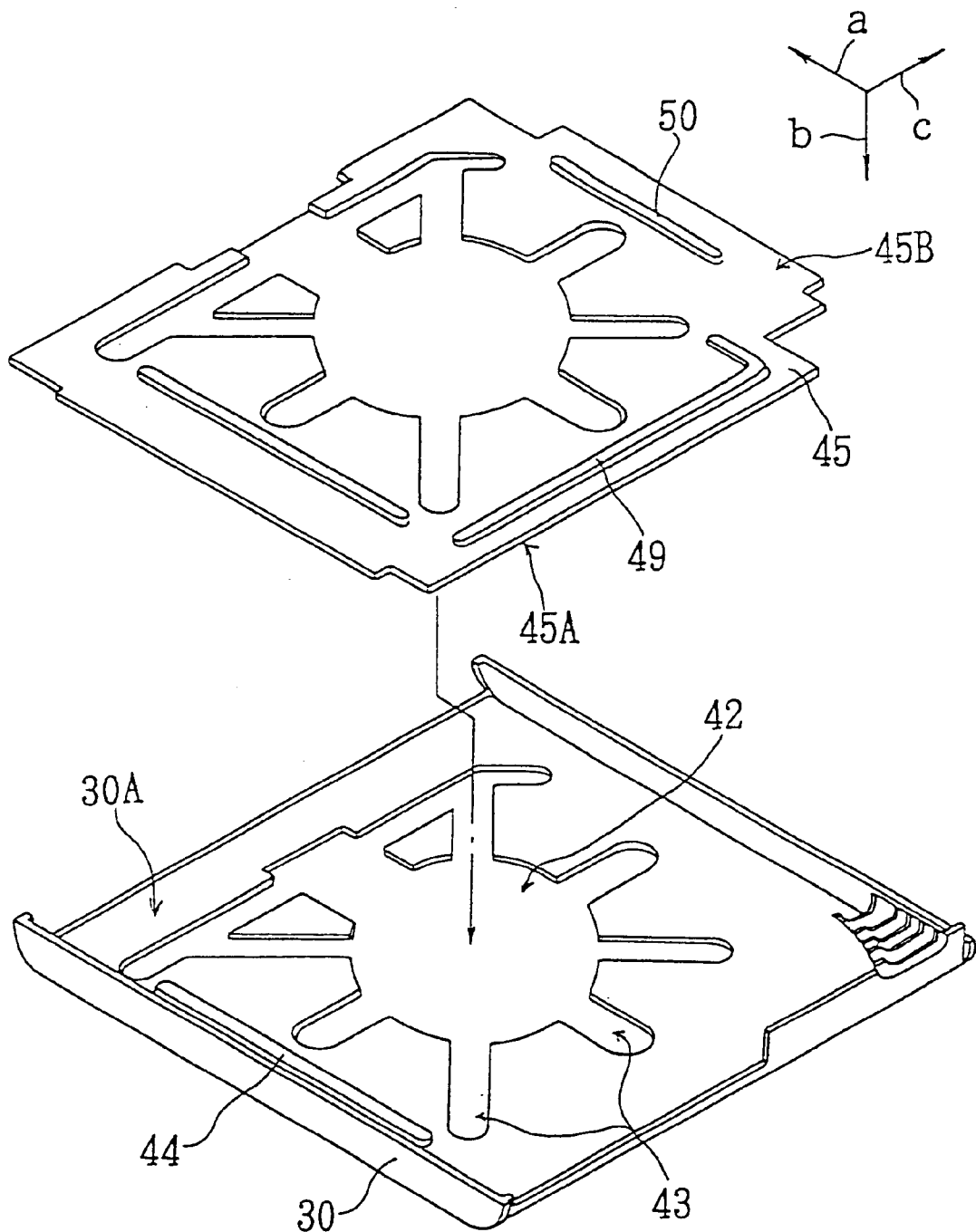
FIG. 12 is a schematic perspective view showing a configuration of a second case half.

On the other hand, as shown in FIG. 12, a first case recess 42 having a generally circular orifice is provided in the middle of the inner surface 30A of the top plate of the second case half 30, a plurality of channel-like second case recesses 43 running into the first case recess 42 are provided radially from the first case recess 42, and a case protrusion 44 approximately parallel to the direction from the front to rear end is provided on the right end.

A second shield plate 45 made of an appropriate metal material functioning as a electrical shielding is placed on the inner surface 30A of the top plate of the second case half 30.

One surface 45A of the second shield plate 45, a first and second shield plate protrusions having substantially the same shape as the first and second case recesses 42 and 43 of the second case half 30 are embossed to the surface 45A from the other surface 45B so as to be opposed to the first and second case recesses 42 and 43, and shield plate recesses having approximately the same shape as the case protrusion 44 is embossed from the surface 45A to the other surface 45B so as to be opposed to the protrusions.

On the other surface 45B of the second shield plate 45, an L-shaped third shield plate recess 49 is embossed from the surface 45A to the other surface 45B, and a forth shield plate protrusion 50 approximately parallel to the depth direction is embossed on the right end from the surface 45A to the other surface 45B.

The second shield plate 45 is placed on the inner surface 30A of the top plate integrally therewith by abutting the surface 45A against the inner surface 30A of the top panel of the second case half 30, abutting the first and second shield plate protrusions and the shield plate recess against the opposite first and second case recesses 42 and 43 and the case protrusion 44, respectively.

Thus, in the second case half 30, although the portion in the top plate in which the first and second case recesses 42 and 43 is thinner than the remaining portions, the strength of the thinner portion is reinforced by abutting the first and second shield plate protrusions of the second shield plate 45 against the first and second case recessions 42 and 43.

In addition, in the second case half 30, the strength of the top plate is reinforced by abutting the shield plate recess of the second shield plate 45 against the case protrusion 44, and the strength of the second shield plate 45 is reinforced by the third and forth shield plate protrusions 49 and 50, thereby the top plate of the second case half 40 is further reinforced along with the second shield plate 45.

If the thickness of the top plate is reduced, its strength is weakened accordingly, because the second case half 30 is made of resin.

On the other hand, because the second shield plate 45 is made of metal, the strength its top plate can be provided according to its thickness and certain degree of strength can be obtained with a relatively thin plate.

While the thickness of the second shield plate 45 is chosen depending on a desired strength, its strength can be improved compared with a plate without protrusions and recesses by forming the step on one surface 45A and the other surface 45B in such a way that the first and second shield plate projections and the shield plate recesses are provided as described above, therefore, its thickness is made thinner accordingly.

As a result, in the main portion 2, the second shield plate 45 having a desired strength can be used even if its thickness is substantially thin, and, by abutting the second shield plate 45 against the top plate of the second case half 30 to combine with each other to make the top plate of the second case half 30 to have sufficient strength even if the top plate of the second case half 30 is thin. Thus, the thickness of the top plate of the second case half 30 can be reduced and therefore the total thickness of the top plate combined with the second shield plate 45 can be substantially reduced compared with the main portion of a conventional drive unit.

Figure 13:
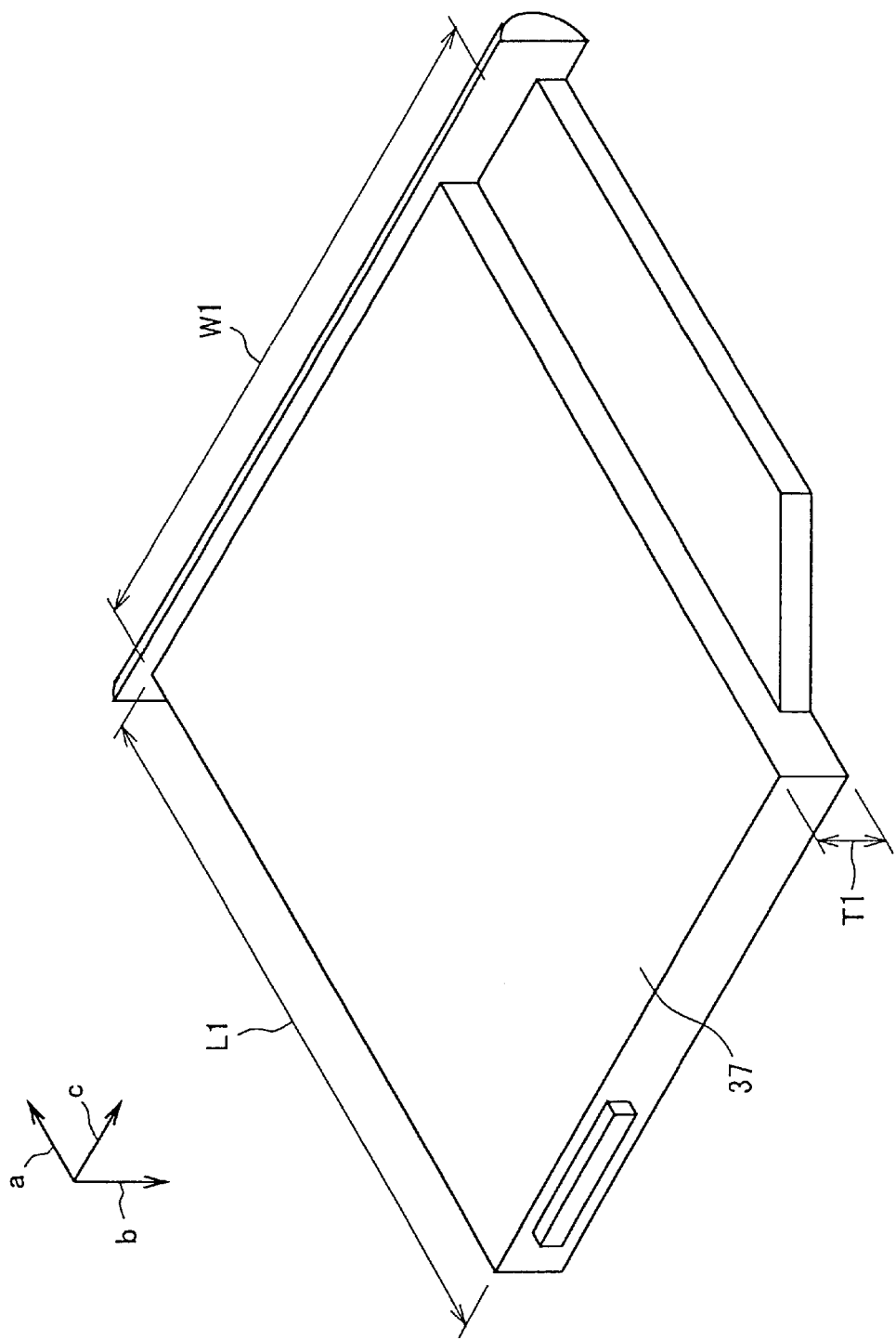
FIG. 13 is a schematic perspective view showing dimensions of a CD-ROM drive.
Figure 14:
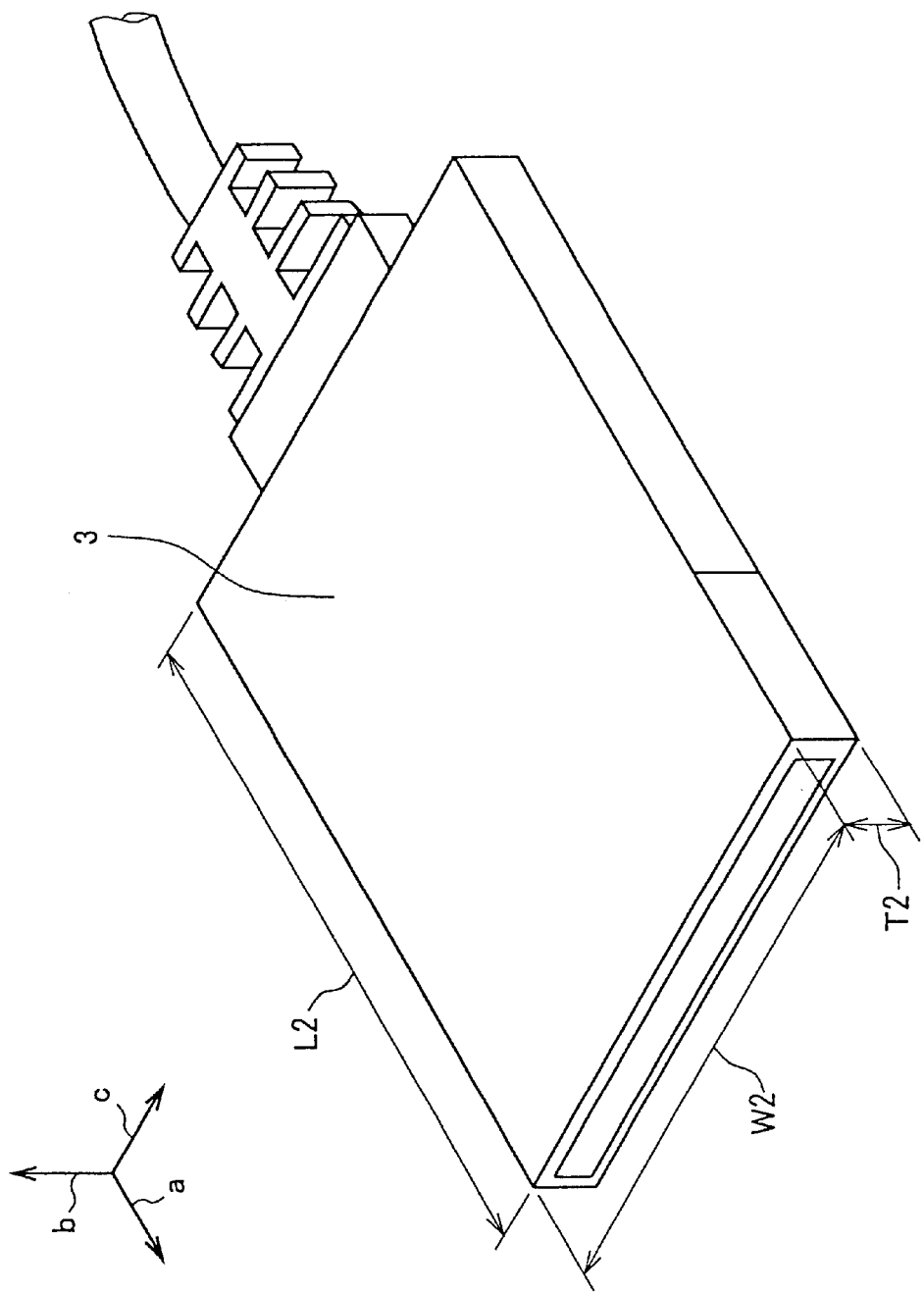
FIG. 14 is a schematic perspective view showing dimensions of a card unit of the card-type connector.

In practice, the CD-ROM drive 34 has a length L1 in the front to rear direction of approximately 126 mm, a width W1 of approximately 128 mm, and a thickness T1 of approximately 12 mm, as shown in FIG. 13.

The card unit 11 of the card-type connector 3 has a length L2 in the front to rear direction of 85.6 mm, a width W2 of 54 mm, and a thickness T2 of 5 mm.

Figure 15:
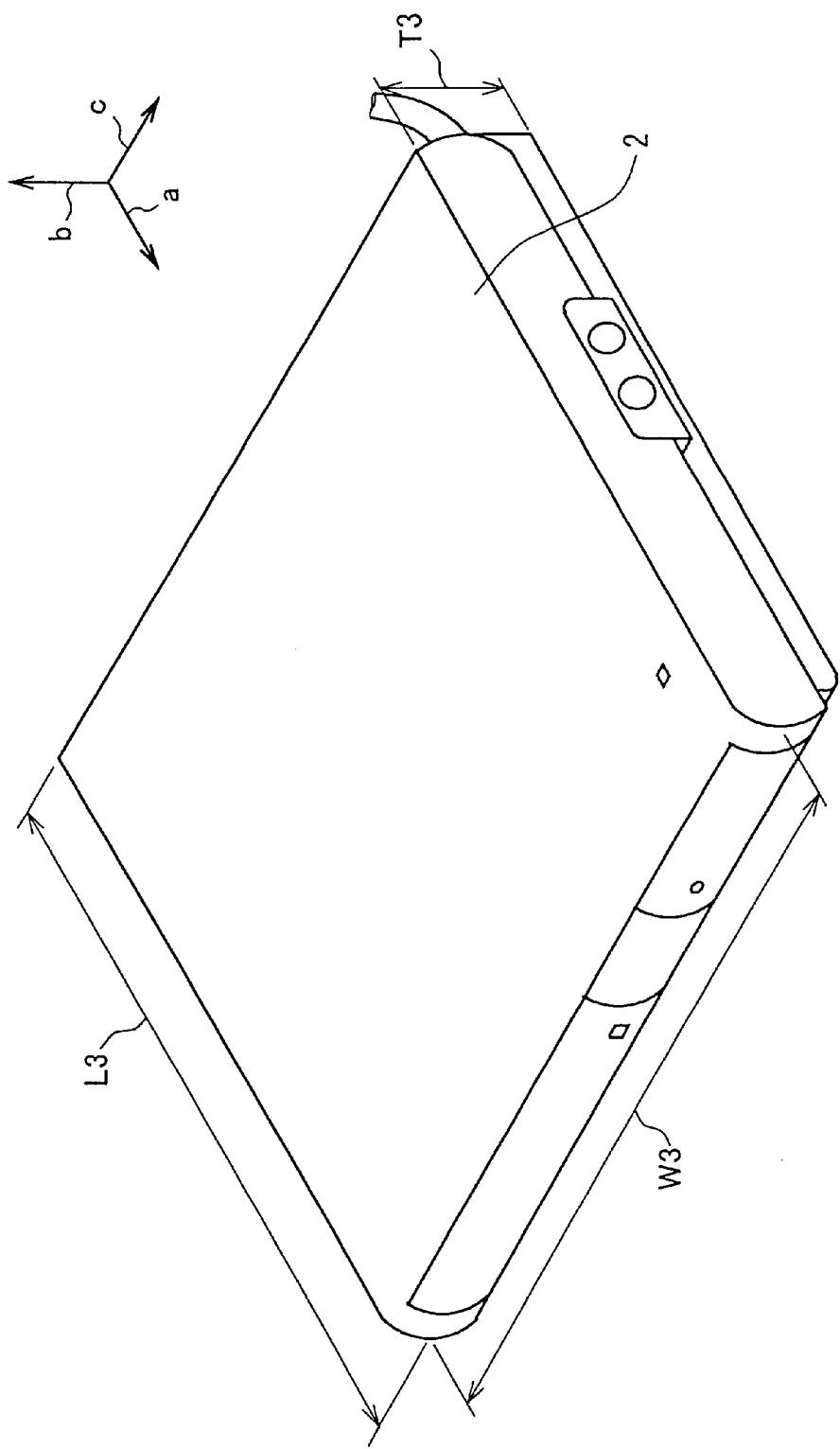
FIG. 15 is a schematic perspective view showing dimensions of the main portion.

In the main portion 2, even the CD-ROM drive 34 is contained inside and the recess for card 15A and the recess for cable 15B are provided in another surface 2D, the length L3 of the main portion 2, as shown in FIG. 15, can be made approximately 153 mm and the width W3 144.4 mm, which are considerably close to the length L1 and width W1, and the thickness T3 can be made approximately 24 mm, which is considerably close to the total thickness of the stack of the CD-ROM drive 34 and the card unit 11 of the card-type connector 3 (that is, approximately 17 mm), thus the size of the main portion 2 can be considerably reduced.

(4) Operation and Effect of the Embodiment

In the configuration described above, the card unit 11 of the card-type connector 3, the first and second cable holding members 12 and 13, and the signal cable 4 are inserted into the recess for card 15A, the recess for holding member 15C, and the recess for cable 15B provided in another surface 2D of the main portion 2 of the drive unit 1, respectively when the drive unit 1 is carried.

In this state, the card unit 11 inserted into the recess for card 15A are removably held in the recess for card unit ISA by the elastic members 16, the signal cable 4 inserted into the recess for cable 15B is removably held in the recess for cable 15B by the projection 17, and the first and second cable holding members 12 and 13 are held in the recess for holding member 15C in a virtually removably manner by the held card unit 11 and signal cable 4.

Thus, in the drive unit 1, when carried, the card-type connector 3 and the signal cable 4 are held in the main portion 2 of as one united body to make the drive unit 1 handy, improving its portability.

In addition, in the drive unit 1, the card-type connector 3 and the signal cable 4 are held in the recess for card 15A and the recess for cable 15B of the main portion 2 so as not to project outward, thus the unitarity of the card-type connector 3 and the signal cable 4 with the main portion 2 can be improved to further improve the portability of the drive unit 1.

In the drive unit 1, because, when carried, the ferrite core case 14 is removably held in the case holder 19 of the main portion 2 by fitting the case recessions 18 of the ferrite core case 14 into the main portion projections 20 of the case holder, the drive unit 1 can be handled easily with the ferrite core case 14 held in the main portion 2 during carriage, and in this state, portions of the signal cable 4 near the ferrite core case 14 is made close to the rear side 2E so as to be united with it.

The drive unit 1 allows the ferrite core case 14 to be held in the case holder 19 with being disposed to the left or right with respect to the case holder 19, even if the ferrite core case 14 is disposed to the left or right due to the hold of the card-type connector 3 and the signal cable 4 in another surface 2D of the main portion 2, or if variations in the length of the signal cable 4 or the precision of the mounting position of the ferrite core case 14 with respect to the signal cable 4 occur, thus preventing sagging of portions of the signal cable 4 near the ferrite core case 14.

Consequently, the unitarity of the ferrite core case 14 and the portions of the signal cable 4 near the ferrite core case 14 with the main portion 2 can be further improved and thus the handling of the main portion 2 during carriage can be easier.

In addition, in the drive unit 1, when the manual ejection of CD-ROM from the main portion 2 is not required, the pin member 23 of the manual eject pin 22 is inserted into the hole 28 in the storage space 26 and the pin holder 24 is inserted into the notch 27 to fit the pin protrusions 25 of the pin holder 24 into the storage space recessions 27D, so that the manual eject pin 22 is removably stored in the storage space 26.

On the other hand, when the CD-ROM is required to be manually removed from the main portion 2, the manual eject pin 22 is pulled out of the storage space 26, and the pin member 23 of the manual eject pin is inserted into the manual eject hole 18 in the operation panel 5 to release the hold of the tray in the main portion 2.

Thus, in the drive unit 1, because the manual eject pin 22 can be contained in the storage space 26 and stored with the main portion 2 when manual ejection of the CD-ROM from the main portion 2 is not required, loss of the manual eject pin 22 can be prevented.

When the CD-ROM is required to be manually removed from the main portion 2, the manual eject pin 22 is taken out from the storage space 26 and used to release the hold of the tray easily.

Because one end of the pin member 23 contained in the pin holder 24 in the manual eject pin 22, the user can conveniently grasp the manual eject pin 22 by the pin holder 24, improving the operability.

According to the configuration described above, the recess for card 15A accommodating the card-type connector 3 and the signal cable 4, the recess for cable 15B, and the recess for holding member 15C are provided in the another surface of the main portion 2, and when carried, the card unit 11 of the card-type connector 3, the first and second cable holding members 12 and 13, an the signal cable 4 can be inserted into the recess for card 15A, the recess for cable 15B, and the recess for holding member 15C to removably hold them, thereby the main portion 2, the card-type connector 3, and the signal cable 4 can be combined as one unite body to make the unit handy to carry, thus, the handy-to-carry drive unit can be implemented.

Because the ferrite core case 14 is removably held in the case holder 19 by fitting the case recessions 18 of the ferrite core case 14 into the main portion protrusions 20 of the case holder 19 of the main portion, the ferrite core case can be held in the main portion as one unite body when carried to make it handy, and the ferrite core case 14 can be displaced to the right or left with respect to the case holder as required to prevent the sagging of portions of the signal cable 4 near the ferrite core case 14, thus, the drive unit can be carried more conveniently.

In addition, because the main portion 2 is arranged in such a way that the manual eject pin 22 having the pin member 23 is provided and the manual eject pin 22 is removably stored in the storage space 26, the manual eject pin 22 can be stored in the storage space 26 when the manual ejection of the CD-ROM from the main portion 2 is not required, preventing the manual eject pin 22 from being lost, and the manual eject pin 22 can be taken out from the storage 26 and used readily to release the hold of the tray so that the manual removal of the CD-ROM can be performed readily when the CD-ROM is required to be manually removed from the main portion 2.

(5) Other Embodiments

While in the embodiment described above the recess for card 15A, and the recess for card 15B, and the recess for holding members 15C are provided in the back side 2D of the main portion 2, the present invention is not limited to that implementation. Recesses may be any other part of the unit, provided that the card-type connector 3 and the signal cable 4 can be held in the main portion 2 as one unite body, such as by providing one or more recesses in one surface 2B or the sides of the main portion 2 for holding the card-type connector and the signal cable 4.

While in the embodiment described above the shape and size of the orifice of the recess for card 15A is chosen according to the shape and size of one surface of the card unit 11, the present invention is not limited to that implementation. The shape and size of the orifice of the recess for holding the card unit 11 may be chosen according to the shape and size of the front side of the card unit, and in addition, the depth of the recess may be chosen so as to be approximately the same as the length in the direction from the front to rear end of the card unit 11, or the shape, size, and depth of the orifice of the recess for holding the card unit may be chosen such that the first and second cable holding members 12 and 13 together with the card unit 11 can be inserted in the recess, from the front side of the card unit to the second cable holding member 13, and various other shapes, sizes, and depths of the orifice of the recess for holding the card unit 11 may be chosen.

While in the embodiment described above the recess for cable 15B is formed as an L-shape, the present invention is not limited to that implementation. The recess for holding the signal cable 4 may be formed as various other forms, for example, a spiral.

While in the embodiment described above the other end of the signal cable 4 is held in the recess for cable 15B, the present invention is not limited to that implementation. For example, the recess for holding the signal cable 4 may be formed from the rear side 2E to another surface 2D, and the entire signal cable 4 may be held in this recess, or the ferrite core case may be held in the recess together with the entire signal cable.

While in the embodiment described above the signal cable 4 is pulled out from inside of the main portion 2, the present invention is not limited to that implementation. The signal cable may be removably connected to the main portion 2 through an appropriate connector.

While in the embodiment described above the elastic members 16 are provided in the recess for card 15A, the present invention is not limited to that implementation. Claws may be provided in the recess for card 15A and the cared unit 11 may be removably held in the recess with the claws.

While in the embodiment described above the projections 17 are provided in the recess for cable A, the present invention is not limited to that implementation. For example, the recess for cable 15B may be formed as Ω-shape to hold the signal cable 4.

While in the embodiment described above the number of case recesses 18 of the ferrite core case 14 is larger than that of the main portion protrusions 20 of the case holder 19, the present invention is not limited to that implementation. If the width all the protrusions of the ferrite core 14 is made equal to that of recessions in the case holder 19, the number of the case recesses 18 of the ferrite core case 14 may be smaller than that of the main portion protrusions 20 and the ferrite core case 14 still can be held in the case holder 19 with displaced.

While in the embodiment described above the case recesses 18 of the ferrite core case 14 are provided at the same pitch as the main portion protrusions 20 of the case holder 19, the present invention is not limited to that implementation. The pitch value of the main portion protrusions 20 of the case holder 19 may be an integral multiple of that of the case recessions 18 of the ferrite core case 14.

In this case, if a first pitch is chosen as the pitch of the case recessions 180 of the ferrite core case 14 and a second pitch is chosen as the pitch of the main portion protrusions 20 of the case holder 18 and the first pitch of the case recesses 18 is different from the second pitch of the main portion protrusions 20, the ferrite core case 14 can be disposed in pitches and held in the case holder 19.

While the embodiment described above a plurality of case recesses 18 are provided in the ferrite core case 14 and a plurality of main portion protrusions 20 are provided in the case holder 19, the present invention is not limited to that implementation. A plurality of case protrusions may be provided in the ferrite core case 14 at a predetermined pitch and a plurality of main portion recesses mating with the case protrusions may be provided at the same pitch as that of the case protrusions, or at a pitch which is a multiple of that of the case protrusions.

While in the embodiment described above the case holder 19 is provided on the rear side 2E of the main portion 2, the present invention is not limited to that implementation. The case holder 19 may be provided in any other place in the main portion 2.

While in the embodiment described above a plurality of main portion protrusions 20 are provided in the case holder 19 having an arc-shaped bottom, the present invention is not limited to that implementation. A plurality of main portion protrusions or recessions may be provided directly on a predetermined place in the main portion.

While in the embodiment described above the cylindrical ferrite core case 14 having a race-track-shaped end surface, the present invention is not limited that implementation. The ferrite core case may be in any other shape, such as a cylinder having a circular bottom or a prism having a rectangular bottom, which can hold the ferrite core and has a plurality of case recesses or protrusions.

While in the embodiment described above the storage space 26 is provided in another surface 2D of the main portion 2, the present invention is not limited to that implementation. The storage space 26 may be provided in any other place in the main portion 2, such as a predetermined place in a one surface or a side surface of the main portion 2.

While in the embodiment described above one end of the pin member 23 is held in the pin holder 24, the present invention.is not limited to that implementation. The pin member may be used as it is without a holder or one end of the pin member may be bent in an appropriate shape to make it handy.

Figure 16:
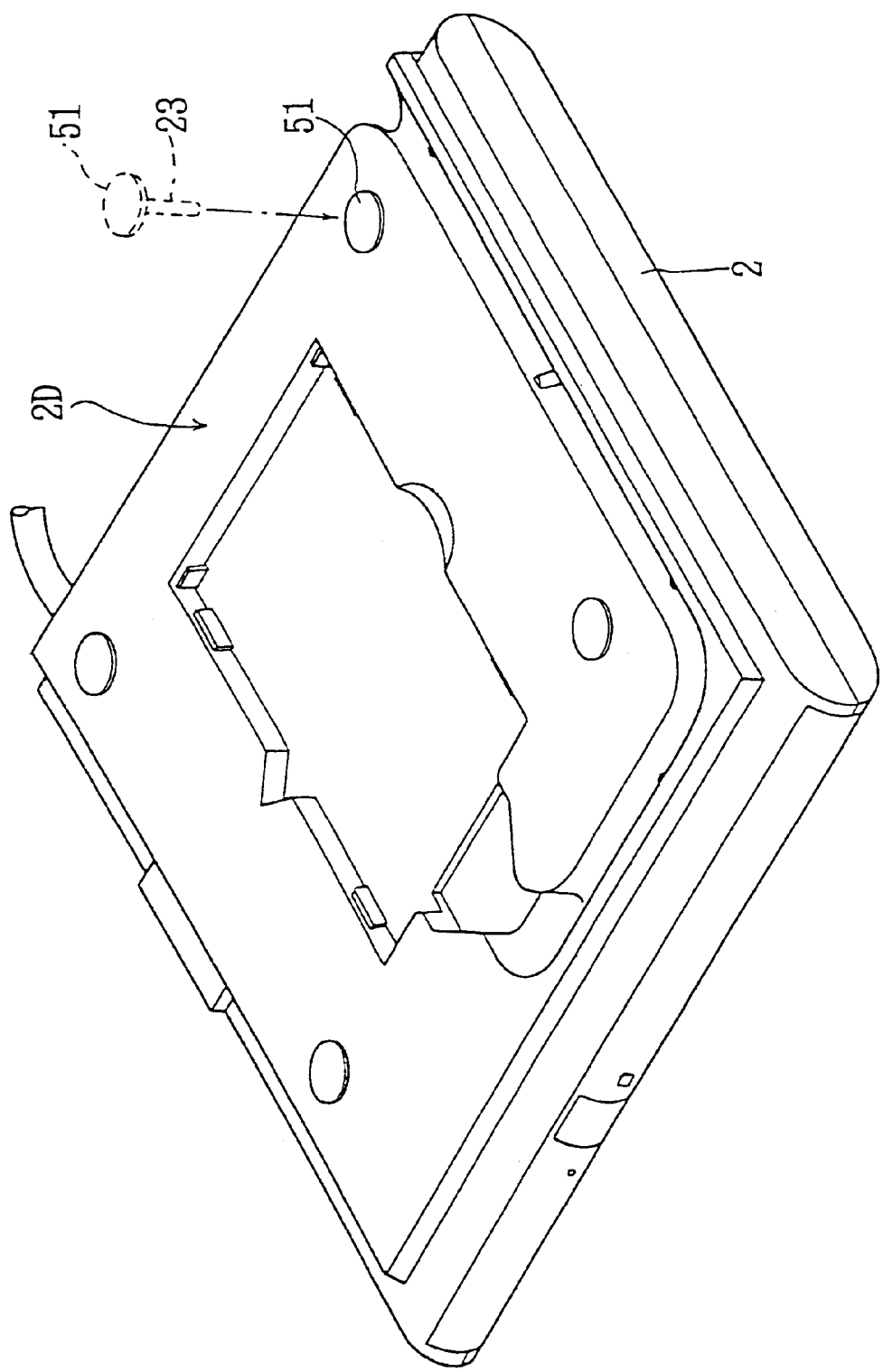
FIG. 16 is a schematic perspective view for describing the storage of a manual eject pin according to an alternate embodiment.

While in the embodiment described above one end of the pin member 23 is held in the pin holder 24, the present invention is not limited to that implementation. One end of the pin member 23 may be held in any other appropriate member which is provided in the main portion 2 and has appropriate capability, for example, one end of the pin member 23 may be held in a rubber foot 51 provided in another surface 2D of the main portion 2 as shown in FIG. 16.

In the case where one end of the pin member 23 is held in the foot as described above, a hole (not shown) is bored in a predetermined portion in which the foot 51 is attached for containing the pin member 23 in another surface 2D of the main portion 2 and, when the CD-ROM is not required to be manually ejected from the main portion 2, the pin member 23 can be contained in the hole for storage.

While in the embodiment described above, the present invention is applied to the drive unit 1 having a main portion 2 containing the CD-ROM drive 34, the present invention is not limited to that implementation. The present invention may be broadly applied various other electronic apparatuses such as recording and/or reproduction apparatuses having a main portion containing a driver for disc-like recording media such as compact disc recordable (CD-R), digital versatile disc read only memory (DVD-ROM), magneto optical (MO) and hard disks or a drive for a memory card.

In this respect, while in the embodiment described above, hold of the tray of the CD-ROM drive 32 within the main portion 2 is released, for a information recording medium contained in a case, such as an Mini Disc (MD), the hold of an information recording medium may be released together with the case.

While in the embodiment described above, the card-type connector 3 having the first and second cable holding member 12 and 13 in the card unit 11 comprising a PCMCIA card is used as an electric connector for external connection, the present invention is not limited to the implementation. Various other types of connectors may be used such as a flat rectangular connector with which a signal cable is electrically connected through, for example a pin connector, or an institute of electrical and electronics engineers (IEEE) 1394 connector which supports an IEEE 1349 interface.

While in the embodiment described above the signal cable 4 coated with elastic material is used as a connecting line for electrically connecting the main portion and the connector, the present invention is not limited to that implementation and any other connecting line may be used which can electrically connect the main portion and the connector.

While in the embodiment described above, the CD-ROM drive is used as recording and/or reproduction means for recording and/or reproducing a predetermined information for a predetermined information recording medium, the present invention is not limited to that implementation and various other types of recording and/or reproduction means may be used, such as a driver for disc-like recording media such as CD-R, DVD-ROM, MO and hard disks or a drive for a memory card.

While in the embodiment described above the housing case consisting of the first and second case half 29 and 30 made of ABS resin is used as a housing case for containing recording/reproduction means, the present invention is not limited to that implementation and other housing cases which are made up of various other members such as an on-piece housing case made of metal.

Figure 17A:
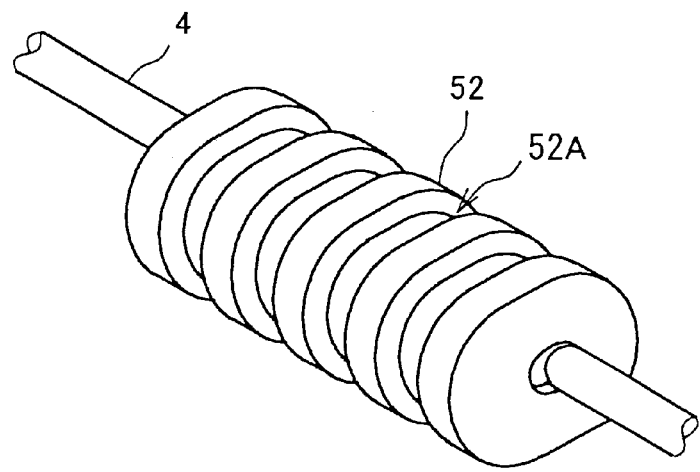
FIGS. 17A, 17B and 17C are schematic perspective views of a ferrite core case according to an alternate embodiment.
Figure 17B:
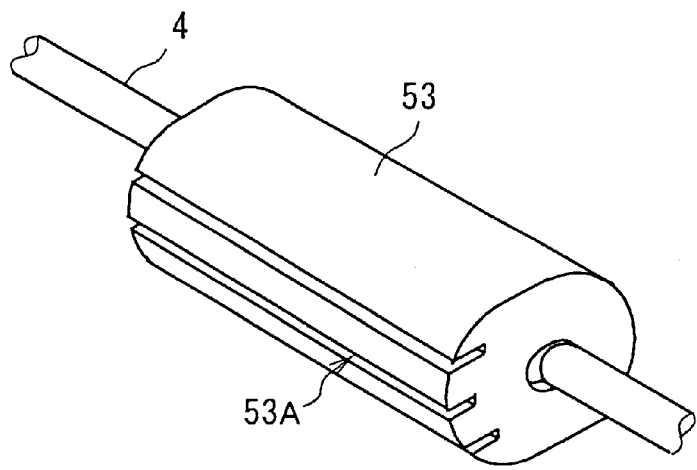
Figure 17C:
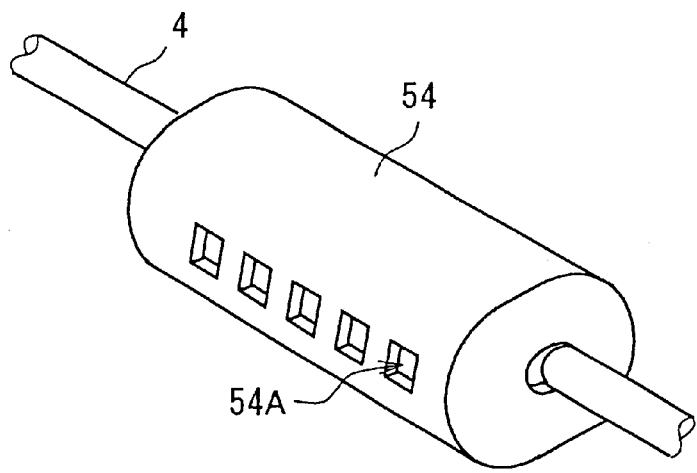

While in the embodiment described above the ferrite core case 14 is used as the case which contains magnetic material and has a plurality of case recesses or protrusions provided at a first predetermined pitch, the present invention is not limited to that implementation. For example, as shown in FIGS. 17A to 17C, a ferrite core case 52 in which a plurality of case recesses 52A rounding the case are provided on-the outer surface at a predetermined pitch along the length of the case, a ferrite core case 53 in which a plurality of case recesses 53A parallel to the length of the case are provided on the outer surface along the direction orthogonal to the length of the case, a ferrite core case 54 in which a plurality of case recessions 54A having a rectangular orifice are provided on the outer surface at a predetermined pitch along the length of the case, or various other cases having case recessions or protrusions in various shapes may be used.

While in the embodiment described above CD-ROM is used as a information recording medium loaded into the inside of the unit, the present invention is not limited to that implementation and various other information media, including a disc-like recording medium such as CD-R, DVD-ROM, and MO, or a semiconductor device such as a memory card may be used.

While in the embodiment described above the pin member 23 made of wire is used as a pin member for release the hold of the information recording medium loaded in a main portion, the present invention is not limited to that implementation and any other pin member may be used, such as those made of relatively hard resin, which can release the hold of the information loaded in the main portion.

While in the embodiment described above the storage space 26 consisting of the notch 27 and the hole 28 is used as storage means for storing the pin member for releasing the hold of the information storage medium loaded in the main portion, the present invention is not limited to that implementation. Any other storage means may be used, such as storage means having an openable cover over the recess, which can store the pin member.

While in the embodiment described above the pin holder 24 which is made of ABS resin and formed in the shape of a generally triangular prism is used as means for holding one end of the pin member, the present invention is not limited to that implementation and holding means formed in any other shape and made of other material such as rubber or metal may be used, which can hold one end of the pin member.

While in the embodiment described above pin protrusions 25 provided in the pin holder 24 and the storage side recessions 27D provided in the notch 27 are used as means for mating the notch of the storage means with the holding means, the present invention is not limited to that implementation and any other mating means may be used which can mate the notch of the storage means with the holding means.

As described above, according to the present invention, in an electronic apparatus comprising a main portion, an electric connector for external connection, and a connecting line for electrically connecting the main portion with the connector, recesses are provided in the main portion for containing and removably holding the connector and connecting line, thereby the connector and the connecting line may be held in the main portion as one united body to make the drive unit handy, thus, the electronic apparatus which can be easily carried is achieved.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An electronic apparatus having a main portion, an electric connector for external connection, and a connecting line for electrically connecting said main portion with said electric connector, wherein said main portion comprising:

a connector recess for containing and removably holding said connector;

a connecting line recess for containing and removably holding said connecting line;

elastic members provided in the interior of said connector recess for holding said connector;

a case provided on said connecting line for containing magnetic material reducing electric noise and having a plurality of case recesses or case protrusions provided on the outer surface at a predetermined first pitch; and a plurality of main portion protrusions or main portion recesses provided in said main portion at a predetermined second pitch for removably holding said case by mating with said case recesses or case protrusions.

2. The electronic apparatus according to claim 1, wherein said main portion protrusions or said main portion recesses hold said case displaced toward predetermined directions in said first pitches or said second pitches.

3. The electronic apparatus according to claim 1, wherein said main portion comprises recording and/or reproduction means for recording or reproducing a predetermined information on said information recording medium.

4. The electronic apparatus according to claim 1, wherein said main portion comprises an expansion apparatus having a plurality of electrical connection terminals.

5. The electronic apparatus according to claim 1, wherein the outer surface of said connecting line is coated with a predetermined elastic material; and said connecting line recess comprises projections being provided alternately on the opposed inner sides for being brought into intimate contact with said connecting line in such a way that said projections are pressed against said coating.

6. The electronic apparatus according to claim 5, wherein said connector is formed in a flat rectangular shape.

7. The electronic apparatus according to claim 5, wherein said connecting line is removably connected to said main portion.

8. The electronic apparatus according to claim 5, wherein said main portion comprising recording and/or reproduction means for recording and/or reproducing predetermined information on a predetermined information recording medium.

\* \* \* \* \*